United States Patent [19]
Organ et al.

[11] 3,750,505
[45] Aug. 7, 1973

[54] BILLET PRODUCTION

[75] Inventors: Allan John Organ, Birmingham;
Clifford Gerald Price, Stourbridge,
both of England

[73] Assignee: The University of Birmingham,
Birmingham, England

[22] Filed: Dec. 27, 1971

[21] Appl. No.: 212,288

[30] Foreign Application Priority Data
Dec. 30, 1970 Great Britain.................. 61,815/70

[52] U.S. Cl.......................... 83/54, 83/189, 83/191,
83/454, 83/461
[51] Int. Cl............................................. B26d 3/16
[58] Field of Search...................... 83/54, 180, 188,
83/189, 191, 198, 454, 461

[56] References Cited
UNITED STATES PATENTS

| | | | |
|---|---|---|---|
| 3,451,298 | 6/1969 | Schaming............................ | 83/198 |
| 3,204,504 | 9/1965 | Bradlee............................... | 83/198 |
| 3,025,739 | 3/1962 | Brehm ............................... | 83/198 |
| 2,412,930 | 12/1946 | Walklet............................... | 83/189 |

Primary Examiner—Andrew R. Juhasz
Assistant Examiner—W. D. Bray
Attorney—Charles J. Merriam et al.

[57] ABSTRACT

An apparatus and method for shearing tubular billets, the billet being engaged within apertures in a fixed and a moveable shear blade, the end part of the stock to be sheared off being located in the moveable shear blade and adjacent part of the stock in the fixed shear blade. A mandrel comprising three relatively moveable parts is provided. The free end or location part of the mandrel is engaged in the part of the stock within the fixed shear blade and the mandrel has a location part externally of the stock and fixed relative to a base part of the apparatus, and there being a moveable part engaged in the part of the stock within the moveable blade and engaged with guide surfaces on the location end support parts. In use, the moveable blade is moved relative to the fixed blade transversely of the tubular stock so that the moveable part of the mandrel moves with the end part of the tube and the end part of the tube and adjacent part of the tube are internally supported by the mandrel.

23 Claims, 3 Drawing Figures

Patented Aug. 7, 1973 3,750,505

BILLET PRODUCTION

BACKGROUND OF THE INVENTION

1. Field of the Invention

This invention relates to an apparatus for, and a method of, producing tubular billets.

Many industrial metal forming operations start from a metal billet. Under certain circumstances the production of a component from a solid billet involves considerable wastage of the raw material. This occurs, for example, when the finished product is hollow and is of axially symmetric form, for example, the inner and outer races for ball and roller bearings. The reason for this wastage is that it is normally not possible during the forming operation to displace all the billet material to the outside of the section to be formed and a relatively crude 'pre-form' shape is therefore formed first and the redundant material is displaced from the 'pre-form' in a subsequent punching operation.

This wastage of material can be avoided to a large extent by forming the hollow component from a tubular billet. Tubular billets can be prepared by cutting from tube of suitable wall thickness but the advantage of reduced material wastage during forming of the component from the billet is partially off-set by the wastage of tube material which is lost during sawing of the billet from the tube and, as tubing is more expensive, weight by weight, than solid bar, this wastage becomes more critical.

2. Description of the Prior Art

It has hitherto been proposed to crop a tubular billet from a tube of suitable wall thickness by positioning the tube in a cropping apparatus comprising a pair of relatively moveable shear blades, positioning the mandrel, which includes two parts, one of which is mounted solely on the other for movement relative thereto in a direction transverse to the axis of the tube, within the tube so that one of the parts of the mandrel is positioned so as to support the length of tube which is to be severed from the stock and so that the other part of the mandrel supports the stock and then moving the moveable blade of the shearing apparatus, and with it said one part of the mandrel, to sever the required length of tube from the tubular stock.

Such a method has not proved satisfactory in practice. The thus sheared surfaces of the tube have not been planar and, in addition, have been irregular and in certain cases jagged. Furthermore, considerable deformation of the internal and external cylindrical surfaces of the tube has occurred.

In certain prior proposals, in an attempt to overcome the above mentioned disadvantages, a relatively complex movement of the shear blades has been provided. For example, the shear blades have been caused to move not only in a single rectilinear direction relative to each other but also in a second rectilinear direction inclined at 90° to the first rectilinear direction.

With such apparatus a satisfactory cut has still not been achieved in commercial production and moreover the rate of production would be relatively slow because of the time required to carry out the two sets of relative movement between the blades.

Furthermore, with prior proposals it has not been possible to shear tubes with a very short length to diameter ratio, for example a ratio of less than unity.

SUMMARY OF THE INVENTION.

It is accordingly an object of the present invention to provide a new and improved apparatus for, and method of, producing tubular billets whereby the above mentioned problems and disadvantages are overcome or are reduced.

According to one aspect of the present invention there is provided apparatus for producing tubular billets from tubular stock comprising a base, a fixed shear blade and a movable shear blade mounted close together on the base for relative movement therebetween along a single path, a mandrel comprising a location part, a moveable part and a support part, the parts of the mandrel being secured together in end to end relationship by securing means extending between the location part and the support part through the moveable part, the location and support parts each having a transversely extending guide surface and the moveable part having opposed transversely extending end surfaces which are engaged with said guide surfaces to guide the moveable part for movement transversely of the mandrel and means, during shearing, to rigidly secure the location part to the base and to locate the moveable and support parts with the interface between the guide and end surfaces thereof aligned with the interface between the blades.

According to another aspect of the present invention, there is provided a method of producing tubular billets from tubular stock comprising, positioning the tubular stock in a cropping apparatus having a base, supporting and end portion of the stock internally by means of a moveable mandrel part, supporting a portion of the stock adjacent to the end portion internally by means of a support mandrel part, engaging the adjacent portion of the stock by a fixed shear blade, engaging the end portion of the stock by a moveable shear blade, moveable relative to the fixed shear blade in a direction transversely of the stock, restraining axial separation of the mandrel parts and guiding the moveable parts for movement relative to the support part in a direction transverse to the longitudinal axis of the stock by engagement of opposed transversely extending end surfaces of the moveable part with guide surfaces, one of the guide surfaces being provided on the support part, the other of the guide surfaces being provided on a location mandrel part, rigidly securing said location part to the base at a position disposed outwardly of the free end of the end portion with the moveable and support parts extending inwardly of the stock from the free end with the interface between the fixed and moving blades being aligned with the interface between an end surface of the moveable part and the guide surface provided on the support part, and causing a single relative movement between the shear blades to shear the end portion from the adjacent portion of the stock, and the mandrel parts moving relative to each other to permit shearing.

In Applicants' invention a satisfactory shear is obtained and this arises particularly from the guiding of both ends of the moveable part of the mandrel between fixed guide surfaces. In the prior art shears the moveable part of the mandrel is guided only at one end by a fixed guide surface and Applicants have found that such an arrangement is one of the main contributions to the unsatisfactory crop obtained hitherto. Other advantages and differences of Applicants' invention will be described hereinafter.

BRIEF DESCRIPTION OF THE DRAWINGS.

The invention will now be described in more detail by way of example with reference to the accompanying drawings wherein.

Figure 1:
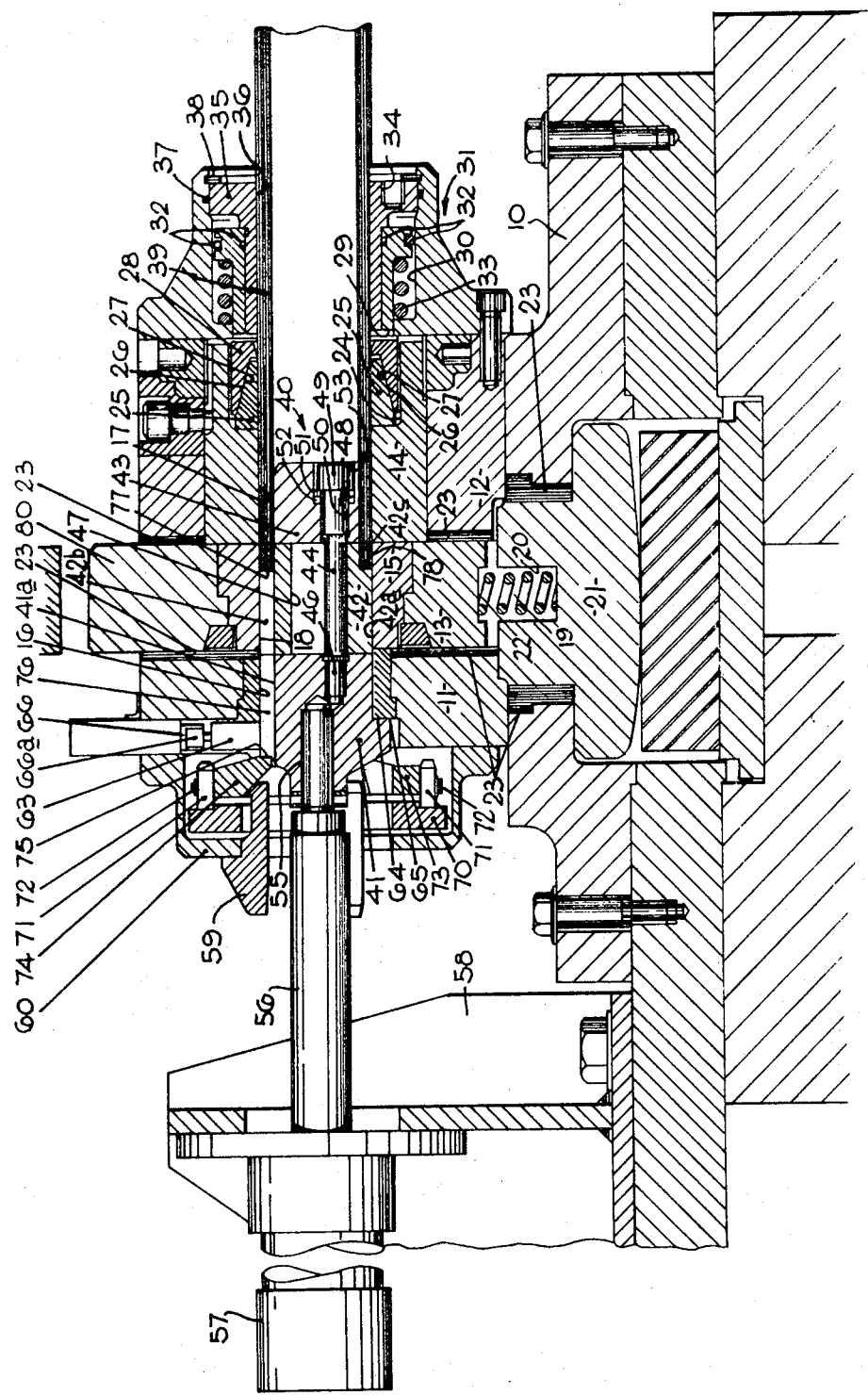
FIG. 1 is a longitudinal sectional view through an apparatus embodying the invention and showing the mandrel in position for shearing.

DESCRIPTION OF THE PREFERRED EMBODIMENT.

The apparatus comprises a base part 10 which carries a guide member 11 and a fixed blade holder 12 between which a moveable blade holder 13 is slidably mounted for movement in a vertical plane. The blade holder 12 has a fixed blade 14 removably mounted therein whilst the blade holder 13 has a moveable blade 15 removably mounted therein.

The guide member 11 and the fixed and moveable blades 14 and 15 are formed with a cylindrical passage 16, 17, and 18 respectively.

A coil compression spring 19 is located in a resess 20 formed in a bolster member 21 provided on the base 10 and the upper end of the spring 19 is engaged in a recess 22 formed in the bottom surface of the blade holder 13. The spring 19 biases the blade holder 13 in a vertically upward direction. The bolster member 21 is slidably mounted on the base 10 and a pad of polyurethane foam material is positioned therebeneath to arrest the downward movement of the blade holder 13. Bronze bearing inserts 23 are provided as shown in the drawings between the moveable blade holder 13 and the guide member 11 and the fixed blade holder 12 and between the bolster member 21 and the base 10.

The fixed blade 14 has a cylindrical recess 24 formed therein which receives a collet comprising three gripping jaws 25 having inclined cam surfaces 26 which cooperate with correspondingly inclined cam surfaces 27 formed on an operating member 28. The member 28 is engaged by a tubular piston 29 slidably mounted in a cylinder 30 formed in an extension part 31 bolted to the fixed blade holder 12. The piston and cylinder are provided with suitable sealing means 32 therebetween. The piston 29 is normally urged to the right in FIG. 1 by means of a coil compression spring 33.

An inlet 34 is provided for the admission of hydraulic and pneumatic fluid into the interior of the cylinder 30.

The inner wall of the cylinder 30 is provided with a tubular member 35 having a cylindrical bore 36. Sealing means 37 are provided to seal the member 35 to the member 31 and a circlip 38 is provided to retain the member 35 in position.

As indicated in FIG. 1, a tubular blank 39 to be sheared is inserted into the passages 36, 17 and 18 and these passages are of such diameter as to be a good sliding fit on the exterior of the blank 39.

A mandrel 40 is engaged within the passages 16, 18 and 17 in the guide member 11 and the movable and fixed blades respectively. The mandrel 40 comprises a location part 41 which is slidably mounted, as hereinafter described in more detail, in the guide member 11 of the apparatus, a movable part 42 which is arranged for movement with the movable blade 15 and a support part 43 which is engaged within the end of the tubular stock within the passage 17.

The parts 41, 42 and 43 of the mandrel are held together by means of a bolt 44 threadably engaged, as indicated at 46, with the location part 41 of the mandrel and which extends through a clearance aperture 47 in the movable part 42 of the mandrel. The bolt 44 has an enlarged diameter part 48 beneath its head 49 and the part 48 is engaged in a correspondingly dimensioned passage 50 in the support part 43 of the mandrel. A steel washer 51 is engaged under the head 49 around the part 48 of the bolt and a polyurethane washer 52 is likewise engaged under the washer 51 around the part 48 of the bolt. The head 49 and washers 51 and 52 are received in a cylindrical recess 53 formed in the end of the support part 43 of the mandrel. It will be seen that the bolt 44 does not extend centrally of the mandrel but is displaced towards the lower side of the mandrel by a distance approximately equal to the radius of the bolt head in order to ensure that there is no contact between the bolt and the wall of the aperture 47 when the movable blade 15 is in its lowermost position.

The parts of the mandrel are clamped together by the bolt 44 by a relatively light pressure sufficient only to maintain the parts in mutual alignment when the mandrel is withdrawn from the apparatus.

The support part 43 of the mandrel is of cylindrical external configuration while the movable part 42 is of stepped cylindrical configuration comprising a larger diameter part 42a formed with three equi-angularly spaced, axially extending grooves 42b and a smaller diameter part 42c which is ungrooved. The location part 41 is likewise of generally cylindrical configuration but is provided with three axially extending grooves 41a similar to the grooves 42b and has an annular shoulder 64 for engagement with a part 65 of the support member 11 for a purpose hereinafter to be described. The location part 41 need not be of similar configuration to the other mandrel parts as it does not enter the stock. It could, for example, be much larger in cross section than the other mandrel parts, and this could facilitate mounting of the location part in the apparatus.

The mandrel is made of tool steel and, when the mandrel is positioned as shown in FIG. 1, in the normal position for shearing, the planes of the interfaces between the mandrel parts 41, 42 and 43 are arranged to be coplanar with the planes of the interfaces between the guide member 11, the movable blade 15 and the fixed blade 14 respectively.

Figure 2:
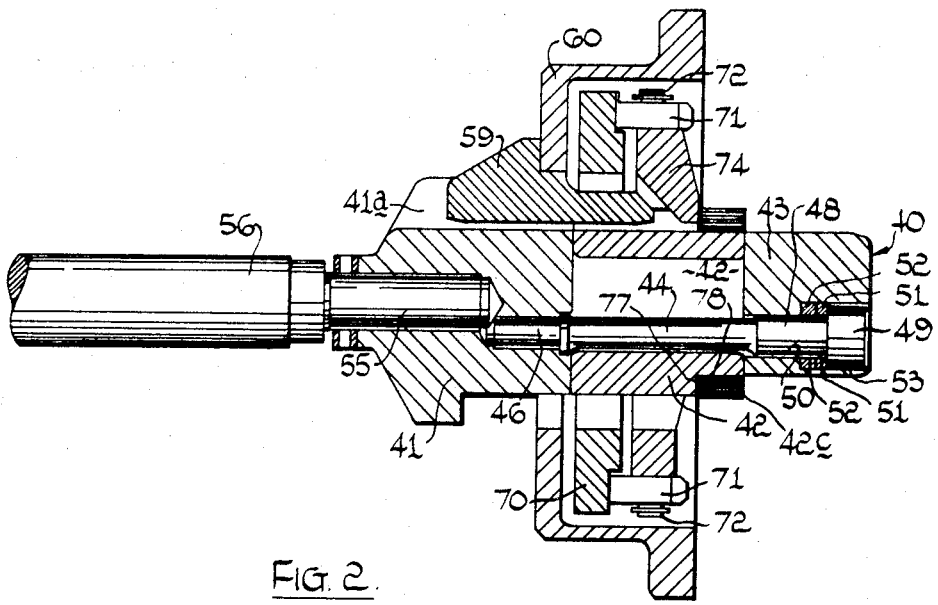
FIG. 2 is a diagrammatic longitudinal sectional view, to an enlarged scale, through part of the apparatus of FIG. 1 showing the mandrel during ejection of a cut-off portion of the stock from the mandrel

The location part 41 of the mandrel is connected, as indicated at 55, to the piston rod 56 of a hydraulic ram 57 mounted on a support 58 upstanding from the base 10 of the apparatus. The ram 57 is operative to move the mandrel 40 axially of the apparatus between the position shown in the Figure and an ejection position in which the mandrel is to the left of the position shown in FIG. 1, as shown in FIG. 2. The mandrel is located in position for shearing by engagement of the shoulder 64 with the abutment part 65 on the guide member 11.

In order to support and guide the mandrel 40 during this sliding movement, guiding fingers 59 are provided on a cap member 60 secured to the guide member 11.

The guide fingers 59 slide in the grooves 41a and 42b provided on the mandrel parts 41 and 42.

Figure 3:
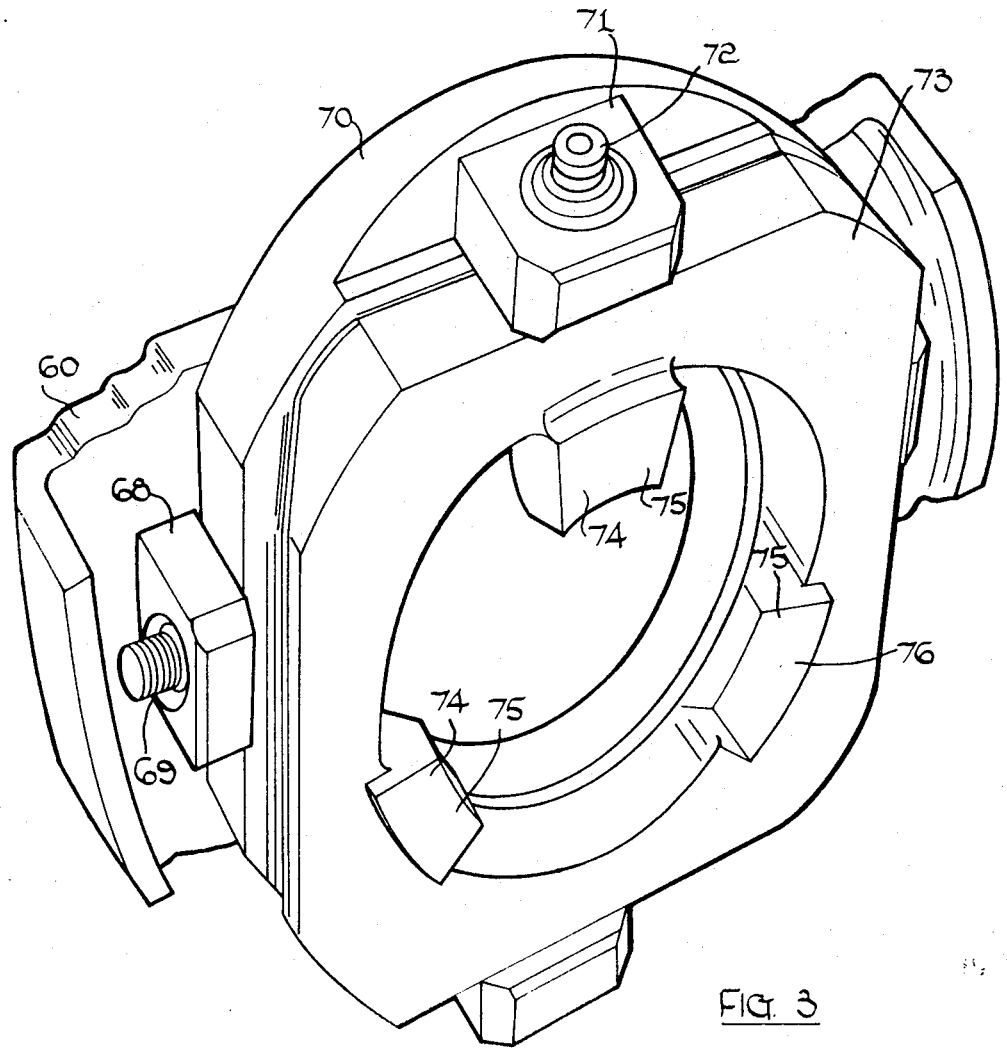
FIG. 3 is a diagrammatic perspective view to an enlarged scale of part of the ejector mechanism of the apparatus shown in FIGS. 1 and 2.

Referring now particularly to FIG. 3, the cap part 60 carries a pair of bearings 68 in which are journaled stud shafts 69 secured to a ring member 70 whereby the ring member 70 is mounted for movement about a horizontal axis. The ring member 70 likewise carries a pair of bearings 71 in which are journaled stud shafts 72 secured to a further ring member 73 whereby the ring member 73 is mounted for rotation about a vertical axis.

The ring member 73 is therefore gimballed for movement about any desired axis.

The ring member 73 carries three claws 74 which, as best shown in FIG. 1, project inwardly so that their forwardly facing surfaces 75 lies inwardly of the end of the tube 39. The claws 74 are positioned so as to slide within the grooves 41a and 42b formed in the mandrel parts 41 and 42.

The top surface 80 of the moving blade holder 13 is positioned beneath the platen of a high energy rate forming machine such as a petro-forge apparatus, a steam hammer or other suitable machine capable of giving the blade holder 13 a speed of movement of at least 5 feet per second.

A hydraulically operated plunger 63 is provided in the guide member 11 in order to displace the cut-off end portion of the stock transversely into an exit passage, not shown, after it has been removed from the support part 43 of the mandrel by the claws 74. The plunger 63 is connected to a piston 66 slidable in a cylinder 66a to which hydraulic or pneumatic fluid under pressure is fed to displace the piston 66 downwardly and hence the plunger 63 into engagement with said end portion of the stock to displace it transversely into the exit passage.

The operation of the apparatus will now be described starting with the feeding of the tubular stock 39 into position for shearing. The mandrel 40 is withdrawn to the left of the position shown in FIG. 2 as a result of the ejection of a cut-off billet at the end of the previous cycle of operations. The tube 39 is then fed into the apparatus from the right until the leading end surface 77 thereof is displaced farther to the left, in FIG. 1, than it should occupy when the tube 39 is placed in the correct position for shearing, and hence the desired position of shear is at this time disposed within the movable shear blade 15.

Hydraulic fluid is then fed to the inlet 34 to the cylinder 30 and the tubular piston 29 thus moved to the left in FIG. 1, so acting on the member 28 to urge the locking jaws 25 into engagement with the external surface of the tubular stock 29 to clamp it to the fixed blade 14 of the apparatus. The ram 57 is then operated to move the mandrel 40 to the right in FIG. 1 so that the abutment surface 78 thereof engages the end surface 77 of the tube 39 and the mandrel is continued to be moved to the right so as to displace the tube 39 to the right against the restraint exerted thereon by the clamping jaws 25. This movement to the right continues until the shoulder 64 of the mandrel part 41 engages the abutment part 65 of the guide part 11 of the apparatus. The abutment surface 78 is positioned on the mandrel part 42 so that the desired length of tube is cut off.

The high energy rate forming machine is then operated to rapidly move the blade holder 13 downwardly. This downward movement of the blade holder and thus of the movable blade 15 also causes downward movement of the portion of the tubular stock 39 within the movable blade 15 and also downward movement of the movable part 42 of the mandrel 40.

The movable blade 15 and the movable part 42 of the mandrel provide sharp cutting edges to the upper outside and lower inside of the tube 39 respectively whilst the fixed blade 14 and the support part 43 of the mandrel provide sharp cutting edges to the lower outside and upper inside of the tube 39. Continued downward movement of the blade 15 in a single movement causes complete shearing of the part of the tube 39 within the blade 15 as a result of fracture which starts at the parts of the tubular stock engaged by the cutting edges.

During shearing the movable part 42 of the mandrel prevents collapse or deformation of the end portion of the tubular stock whilst the support part 43 of the mandrel prevents collapse or deformation of the adjacent portion of the tubular stock 39.

The movable blade 15 is preferably moved downwardly at a speed lying in the range from 10 to 30 feet per second.

It has been found that then the quality of the crop obtained becomes progressively less satisfactory as the speed of shearing falls. It has also been found that if the speed of shearing is increased above approximately 30 feet per second then the improvement in the quality of the shear obtained is relatively small.

The quality of the sheared surfaces obtained is improved, however, at speeds of shearing down to approximately 10 ft. per second as compared with the quality of shear obtained in the apparatuses hitherto used or proposed which have operated only at normal shearing speeds, i.e., of the order of 0.5 feet per second which is a typical speed obtained with a crank type press.

After separation of the end portion from the adjacent portion of the tube 39, the blade holder 13, the moveable blade 15, the end portion and the moveable part 42 of the mandrel are returned to their original position, as shown in FIG. 1 under the action of the spring 19.

When the above described parts have returned to their original position the mandrel is withdrawn by operation of the hydraulic ram 57 to pull the piston rod 56 to the left in FIG. 1 and so withdraw the mandrel and the end portion engaged with the moveable part 42 of the mandrel from the apparatus.

When the mandrel has moved to the position shown in FIG. 2 the forwardly facing surfaces 75 of the claws 74 engage the end surface 77 of the end portion so that continued withdrawal of the mandrel to the left causes displacement of the end portion from the mandrel.

The gimballed mounting of the claws 74 ensures that the ejection load is applied evenly to the end portion at all three points of contact irrespective of any misalignment between the end surface 77 and the surfaces 75 of the claws 74.

Fluid is then fed to the cylinder 66a to displace the piston 66 downwardly so that the plunger 63 engages the end portion and ensures that it is moved positively into the exit passage of the apparatus.

The sequence of operation is then repeated as described hereinbefore.

As described hereinbefore, the parts 41, 42 and 43 of the mandrel are clamped together under a compressive preload by the bolt 44. This preload causes a frictional force between the mating faces of the mandrel parts which ensures that, when the mandrel is withdrawn as described hereinbefore, after return of the moving blade to its original position, the three parts of the mandrel are maintained in co-axial alignment. This makes possible the removal of the end portion and subsequent re-insertion of the mandrel into the tubular stock by actuation of the ram 57 to move the mandrel to the right until it is returned to the position shown in FIG. 1 and described hereinbefore. In addition, the bolt 49 also clamps together the parts of the mandrel in order to ensure the correct relationship between the internal cutting edges provided by the mandrel and the external cutting edges provided by the blades, as described hereinbefore.

If the mandrel parts were free to separate during the cropping process then under the action of the axial loads which result from deformation of the metal they would separate. The movable part 42 would tend to move to the left in FIG. 1 whilst the support part 43 of the mandrel would tend to move to the right. By restraining these two parts axially by means of the bolt 44 the forces generated, which are approximately equal and opposite, are balanced and therefore no load is thrown onto the mechanism which controls the mandrel.

In order to facilitate alignment between the mandrel parts the mating surfaces thereof may be formed to slightly frustoconical configuration whereby a self aligning effect is obtained.

Because of these forces tending to separate the parts of the mandrel it is necessary to ensure that there is no reduction in the clamping effect afforded by the bolt 44 and in order to achieve this the flexible washer made of polyurethane 52 is provided. This flexible washer, which may be made of other suitable material if desired provides a resilient biasing means which, permits a very limited axial separation of the parts of the mandrel during croping but automatically causes the parts to return to their original position after the cropping operation is finished. The steel washer 51 is machined to accurate dimensions in order to provide the necessary restriction to deformation of the polyurethane washer.

The provision of the flexible washer 52 helps to prolong the life of the bolt 44, which would otherwise stretch and possibly fail due to fatigue, and also safeguards against engagement of the parts of the mandrel with the movable and fixed blades which could lead to premature chipping of the contacting items.

By performing the shearing operation at the rates described hereinbefore and in the apparatus described hereinbefore a clean shear perpendicular to the axis of the tubular stock 39 is obtained as a result of a single downward movement of the movable blade 15. Thus, a high quality sheared off tubular billet is obtained at a high production rate. Furthermore, the mechanism of the apparatus is relatively simple as the moving blade 15 has to move only in a single rectilinear direction and therefore no complicated guide mechanism is required for the moving blade holder 13.

In addition the apparatus and method described hereinbefore permit a high quality shear to be obtained in a cut-off having a very short length to diameter ratio of the order of 1 : 4.

By feeding in the tubular stock over the free end of the mandrel ejection of the cut-off is facilitated as the cut-off has to be moved over only a relatively short length of mandrel. In addition, the movable part 42 of the mandrel can be conveniently formed by providing an abutment surface 78 thereon to provide an end stop for the tubular stock 39 to determine the length of the cut-off and also so that the mandrel can axially preload the stock prior to shearing. This axial loading contributes to the quality of shear obtained as it prevents any axial movement of the stock during shearing. It will be appreciated that as in all cropping apparatuses it is important that the rigidity and tolerances in the apparatus are reduced to a minimum so that there is no undesired play between the parts of the article to be sheared. Moreover, the mandrel can serve as an integral part of the ejection mechanism thereby avoiding the need to provide a completely separate ejection mechanism for the cut-off.

Because the mandrel of the present invention is a three part mandrel in which the two end parts 41 and 43 do not move during shearing and in which the movable part 42 slides rectilinearly relative to the parts 41 and 43 the movable part 42 is accurately guided by the surfaces of the parts 41 and 43 which engage therewith, again contributing to the quality of the shear obtained because there is no undesired play between the parts of the mandrel or between the mandrel and the shear blades, and hence the tube to be sheared.

Also, the mandrels can be clamped together by a rigid bolt 44, thereby improving the rigidity of the mandrel and again the accuracy of the shear as, with a relatively massive bolt 44, the separation between the parts of the mandrel during cropping can be accurately determined and controlled by selection of a flexible washer 52 of a desired compressibility.

The cooperating surfaces between the parts of the mandrel may be provided with inter-engaging formations in the form of a transversely extending groove of rectangular cross-section, and a correspondingly shaped projection on the adjacent mandrel part in order to prevent relative rotation between the mandrel parts and to guide the movable mandrel parts during shearing.

In order to improve still further the quality of the shear obtained the tubular stock 39 may be formed with a plurality of grooves at spaced axial positions along the length of the tube corresponding to the length of cut-off required. Each groove extending circumferentially around the whole of the exterior of the tube. Thus, in use, each groove would be aligned with the plane of shear between the fixed and movable blades 14 and 15.

By providing such grooves the stress imposed on the stock in the shearing zone is concentrated in the plane of desired shear and this gives rise to the following advantages. The tool life is increased as the tools need not be so highly stressed as in the cases where no groove is provided. Thus, the material for the tool blades may be of cheaper quality. In addition, there is no need for the tools to actually penetrate the stock and therefore the edges of the blade need not be sharp, thus again increasing the blade life and also increasing the rate of production as there is no need to strip down the apparatus to re-sharpen the blades.

Furthermore, when a complete groove is provided as described above, there is no need for accurate control of the separation between the movable and fixed blades 15 and 14 or of the movable and support parts 42 and 43 of the mandrel to be maintained and therefore the design of the apparatus may be simplified.

The quality of shear will also be improved and there will be little or no facial distortion of the cut-off because the fracture path is guided by the notch. If a V-shaped groove, which is the preferred cross-section of the groove, is provided, the groove will automatically provide bevel edges for the tubular billet and this will be helpful for feeding purposes in further machining operations.

If a groove is provided the length to diameter ratio of the billet may be reduced still further without any reduction in the quality of shear.

It has been found that if a groove is provided then a very wide range of materials can be cropped using the apparatus and method described above, and in addition a larger diameter of tube or a tube having a greater wall thickness may also be cropped.

It will be appreciated that very inexpensive tooling may be used for forming the groove in the tubular stock and that the groove may be formed either in the cropping line or separately. Suitable tooling is, for example, rollers, grinders, or by machining or by impressing into the wall of the tube a sharp edge.

In the specification the phrase "single path" is intended to describe movement of the shear blades in a single rectilinear direction and also movement of the blades in an arc or a similar single curved path and it is intended to exclude movement of the blade in two or more separate directions, for example, a movement in one rectilinear direction and subsequently a movement in a second rectilinear direction inclined, for example, at 90° to the said one direction.

Instead of a washer of an inherently resilient material beneath the head of the bolt the resilient biasing means of the mandrel may comprise a plurality of Belleville washers arranged beneath the head of the bolt or other suitable resilient biasing means.

Furthermore, instead of the gimballed ejection means described hereinbefore, the ejection abutment may comprise fixed fingers positioned in the same place as the gimballed fingers described hereinbefore.

What we claim then is:

1. Apparatus for producing tubular billets from tubular stock comprising a base, a fixed shear blade and a moveable shear blade mounted close together on the base for relative movement therebetween along a single path, a mandrel comprising a location part, a moveable part, and a support part, the parts of the mandrel being secured together in end to end relationship by securing means extending between the location part and the support part through the moveable part, the location and support parts each having a transversely extending guide surface and the moveable part having opposed transversely extending end surfaces which engage with said guide surfaces and means, during shearing, rigidly to secure the location part relative to the base and to locate the moveable and support parts with the interface between the guide and end surfaces thereof aligned with the interface between the blades.

2. Apparatus according to claim 1, including means for causing relative movement between the blades along said path at a speed of at least 10 ft per second.

3. Apparatus according to claim 2, wherein said means can cause relative movement between the blades at a speed lying in the range from 10 ft per second to 30 ft per second.

4. Apparatus according to claim 1, wherein said means comprises a petro-forge apparatus.

5. Apparatus according to claim 1, wherein the moveable blade is provided with an aperture to receive an end portion of the stock to be severed from the remainder of the stock and the fixed blade is provided with an aperture to receive an adjacent portion of the stock.

6. Apparatus according to claim 5, wherein the apertures in the blades and the moveable and support parts of the mandrel are of cylindrical configuration.

7. Apparatus according to claim 1, wherein the moveable blade is mounted for sliding movement between the fixed blade and a guide member provided on the base.

8. Apparatus according to claim 7, wherein said means to rigidly secure the location part to the base during shearing is operable to rigidly secure the location part to the guide member to project outwardly therefrom.

9. Apparatus according to claim 1, wherein the mandrel is provided with an abutment for engagement with the free end of an end portion of the stock, whereby the length of the end portion to be severed from the tubular stock can be determined.

10. Apparatus according to claim 1, wherein clamping means are provided to clamp the tubular stock relative to the fixed blade during shearing.

11. Apparatus according to claim 10, wherein said clamping means comprises a plurality of clamping jaws positioned at spaced positions around the longitudinal axis of the tubular stock and engaged by an operating member and a fluid pressure operable piston, the jaws and operating member having co-operating cam surfaces whereby axial movement of the operating member caused by the fluid pressure operable piston, urges the jaws into clamping engagement with the tubular stock.

12. Apparatus according to claim 1, wherein the securing means includes a resilient biasing means permitting limited axial separation of the parts of the mandrel.

13. Apparatus according to claim 12, wherein the securing means comprises a bolt threadably engaged with the location part and having a head which engages the support part through the intermediary of the resilient biasing means.

14. Apparatus according to claim 1, wherein means are provided for withdrawing the mandrel from shearing relationship with the shear blades in a direction away from the fixed blade, and there being ejection abutment means whereby an end portion of the stock, when severed from an adjacent portion of the stock, is moved into engagement with the ejection abutment means so that, on continued movement of the mandrel in said direction, the abutment means removes the end portion from the free end of the mandrel.

15. A method of producing tubular billets from tubular stock comprising, positioning the tubular stock in a cropping apparatus having a base, supporting an end portion of the stock internally by means of a moveable mandrel part, supporting a portion of the stock adjacent to the end portion internally by means of a support mandrel part, engaging the adjacent portion of the stock by a fixed shear blade, engaging the end portion of the stock by a moveable shear blade, moveable relative to the fixed shear blade in a direction transversely of the stock, restraining axial separation of the mandrel parts and guiding the moveable part for movement relative to the support part in a direction transverse to the longitudinal axis of the stock by engagement of opposed transversely extending end surfaces of the moveable part with guide surfaces, one of the guide surfaces being provided on the support part, the other of the guide surfaces being provided on a location mandrel part, rigidly securing said location part to the base at a position disposed outwardly of the free end of the end portion with the moveable and support parts extending inwardly of the stock from the free end with the interface between the fixed and moveable blades being aligned with the interface between an end surface of the moveable part and the guide surface provided on the support part, and causing a single relative movement between the shear blades to shear the end portion from the adjacent portion of the stock, and the mandrel parts moving relative to each other to permit shearing.

16. A method according to claim 15, wherein the speed of relative movement between the blade is at least 10 ft.

17. A method according to claim 16, wherein the speed of relative movement between the blades lies in the range from 10 ft per second to 30 ft per second.

18. A method according to claim 15, wherein the blades are provided with apertures in which the end and adjacent portions of the stock are positioned during shearing.

19. A method according to claim 15, wherein the blades are formed to closely conform to at least part of the external surfaces of the stock engaged therewith.

20. A method according to claim 15, wherein the moveable and support portions are formed to closely conform to at least part of the internal surfaces of the stock engaged therewith.

21. A method according to claim 18, wherein, during shearing, clamping means are engaged with the stock to clamp the stock relative to the fixed blade.

22. A method according to claim 21, wherein, prior to shearing, the stock is introduced into the apparatus so that the desired axial position of shear is in the path of movement of the moveable shear blade and the mandrel is advanced in the direction to engage an abutment portion of the mandrel with the free end of the end portion to displace the stock against the restraint exerted by said clamping means, to position the tube in the desired axial position for shearing.

23. A method according to claim 15, wherein the end portion is removed from the mandrel after return of said relatively moveable blades to their original position by withdrawal of the mandrel in the direction away from said adjacent portion of the stock to engage the end portion with ejection abutment means whereby continued movement of the mandrel displaces the end portion of the mandrel.

* * * * *